Sept. 8, 1953            H. J. LA VEILLE           2,651,206
MOTION CONVERTING MECHANISM
Filed Sept. 17, 1951                       8 Sheets-Sheet 1
FIG__1
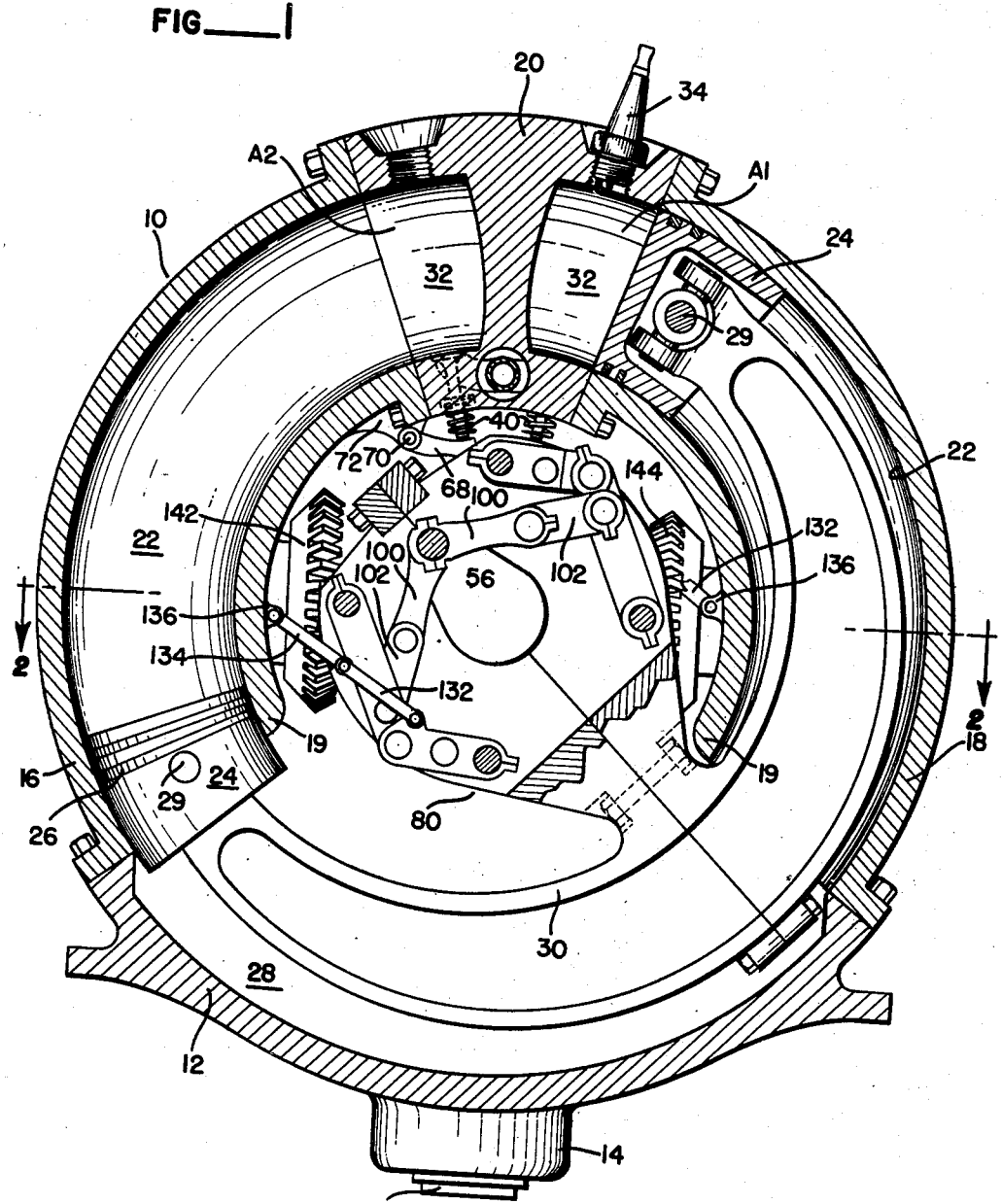
HENRI J. LA VEILLE
INVENTOR.
BY Smith & Tuck
ATTORNEYS Sept. 8, 1953 H. J. LA VEILLE 2,651,206
MOTION CONVERTING MECHANISM
Filed Sept. 17, 1951 8 Sheets-Sheet 2
FIG___2
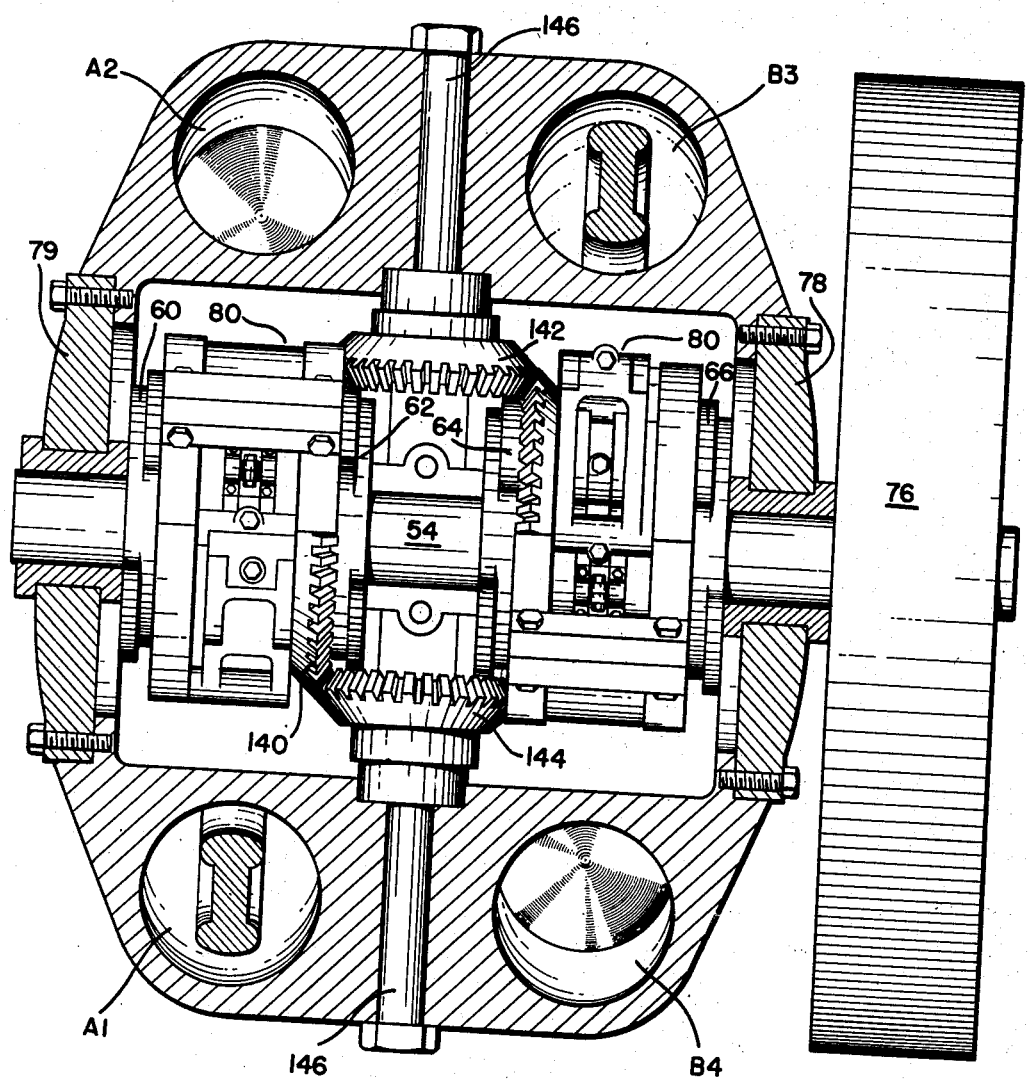
HENRI J. LA VEILLE
INVENTOR.
BY Smith & Tuck
ATTORNEYS Sept. 8, 1953
H. J. LA VEILLE
2,651,206
MOTION CONVERTING MECHANISM
Filed Sept. 17, 1951
8 Sheets-Sheet 3
FIG.__3
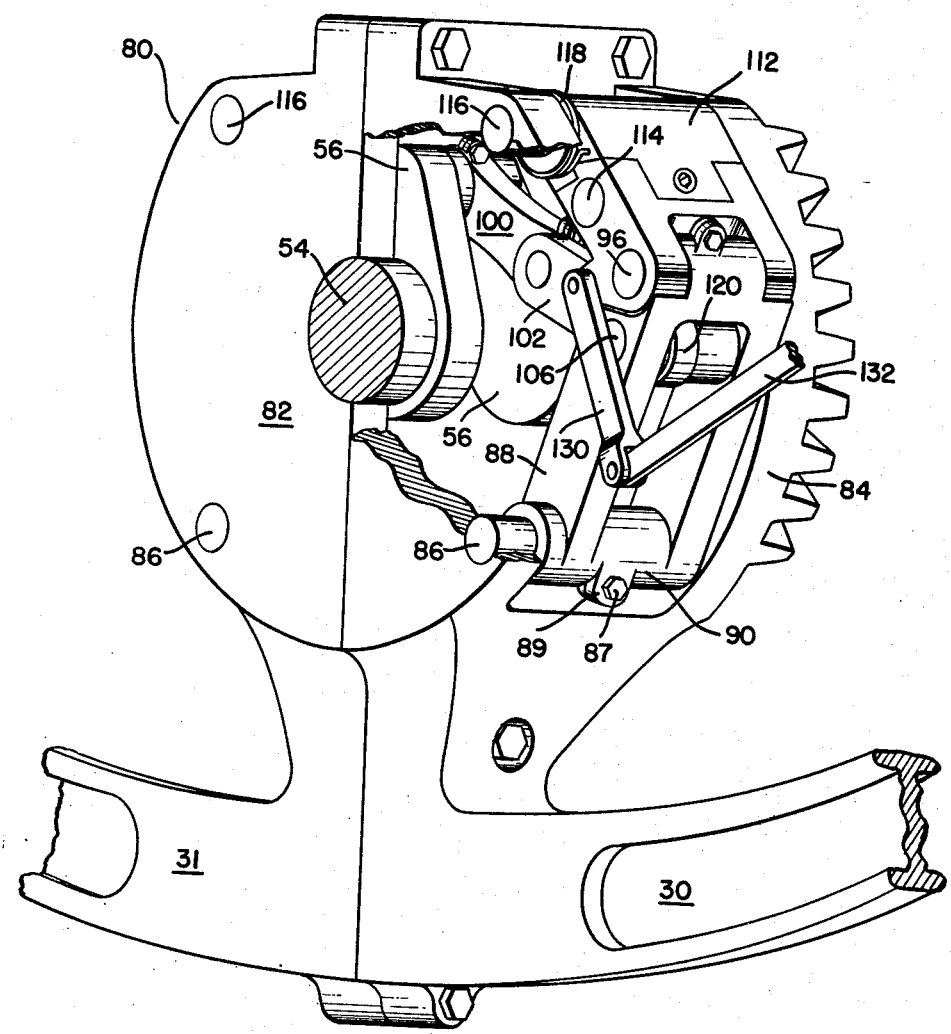
HENRI J. LA VEILLE
*INVENTOR.*
BY *Smith & Tuck*
ATTORNEYS

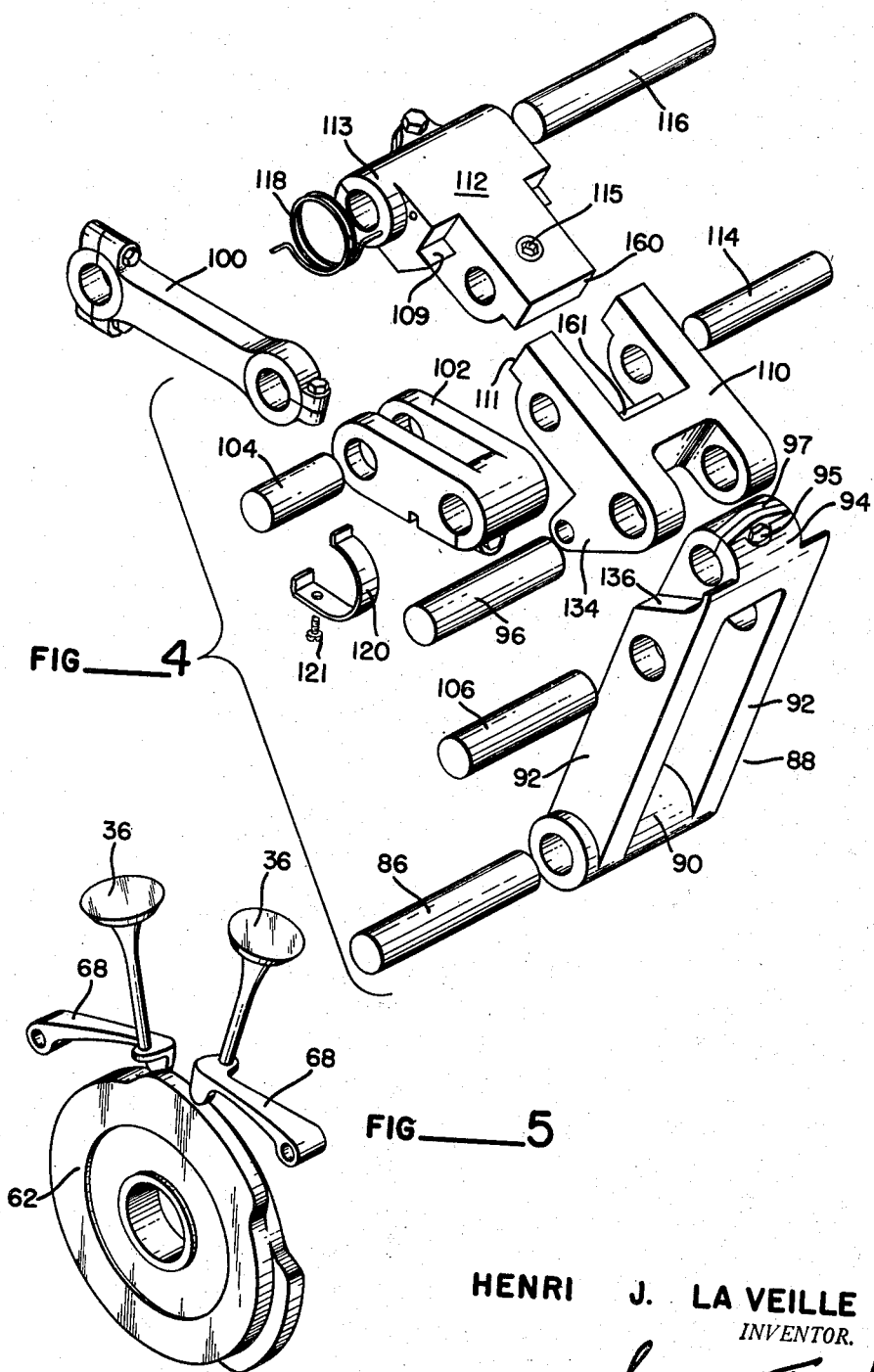

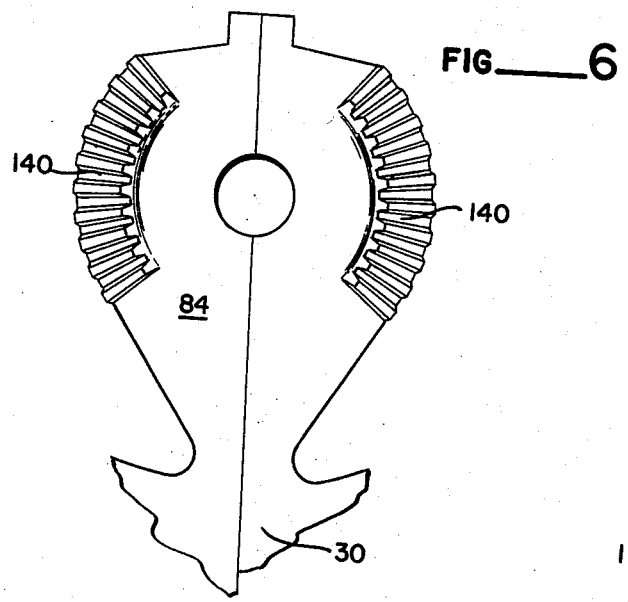
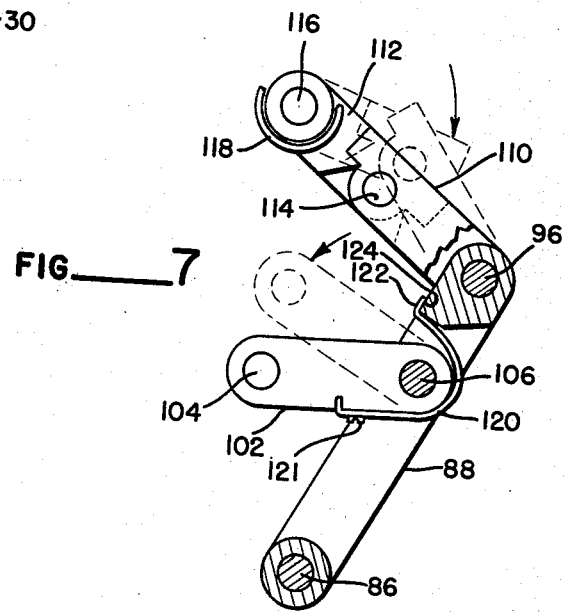

Sept. 8, 1953
H. J. LA VEILLE
2,651,206
MOTION CONVERTING MECHANISM
Filed Sept. 17, 1951
8 Sheets-Sheet 6
FIG__8
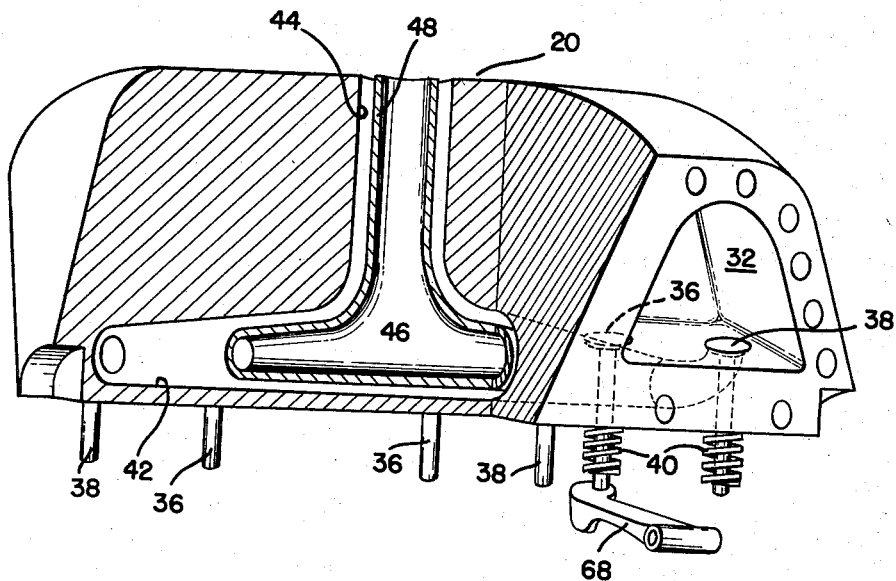
FIG__9
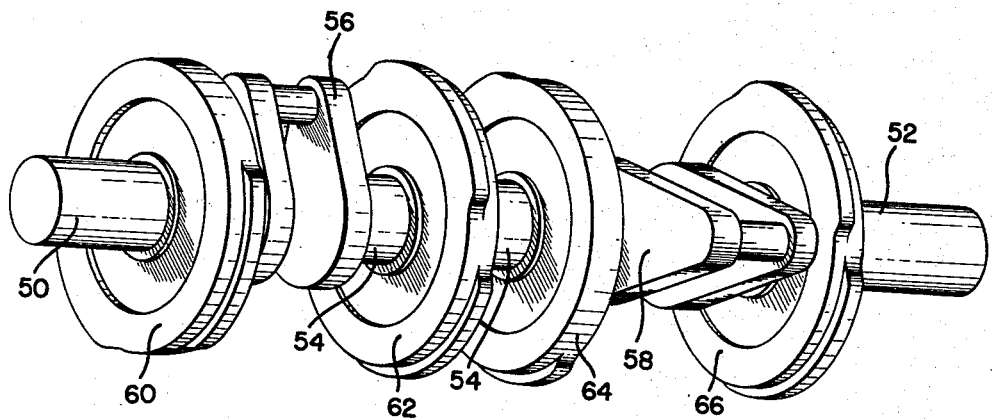
HENRI J. LA VEILLE
*INVENTOR.*
BY Smith & Tuck
ATTORNEYS Sept. 8, 1953  H. J. LA VEILLE  2,651,206
MOTION CONVERTING MECHANISM
Filed Sept. 17, 1951  8 Sheets-Sheet 7
FIG. 10
A1 FIRES
A2 COMPRESSES
B3 INTAKES
B4 SCAVENGES
FIG. 11
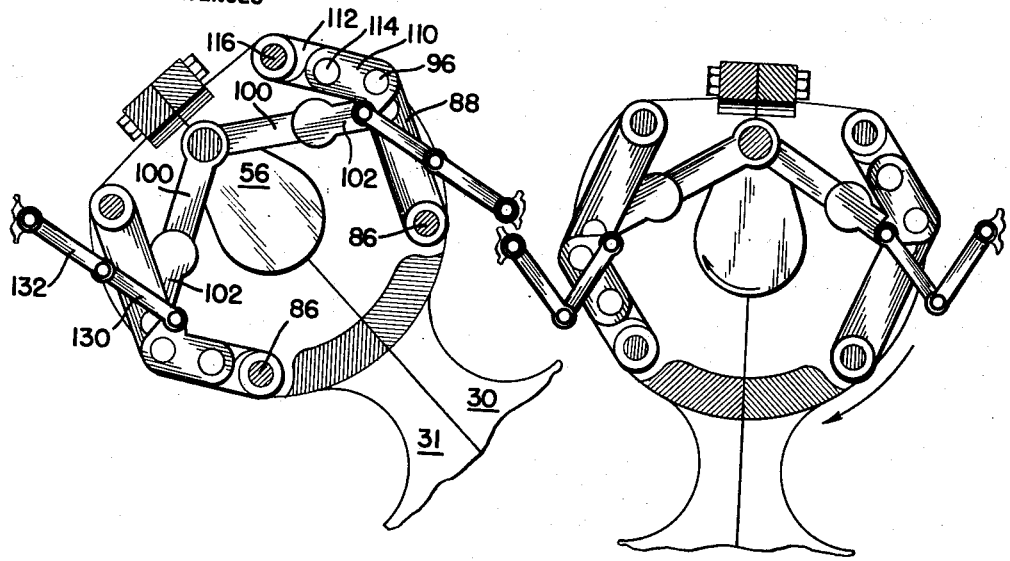
FIG. 12
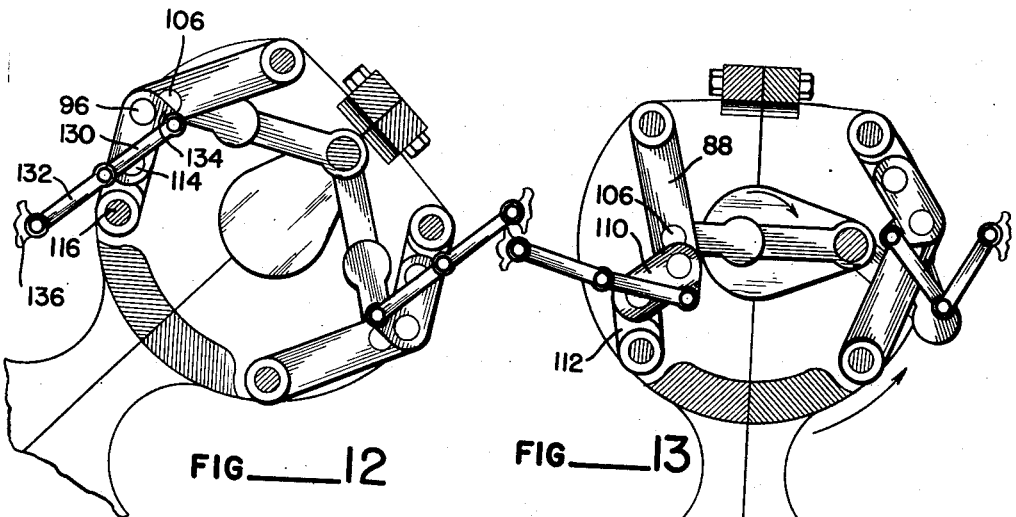
FIG. 13
A2 FIRES
B3 COMPRESSES
B4 INTAKES
A1 SCAVENGES
HENRI J. LA VEILLE
INVENTOR.
BY Smith & Tuck
ATTORNEYS Sept. 8, 1953
H. J. LA VEILLE
2,651,206
MOTION CONVERTING MECHANISM
Filed Sept. 17, 1951
8 Sheets-Sheet 8
FIG__14
B3 FIRES
B4 COMPRESSES
A1 INTAKES
A2 SCAVENGES
FIG__15
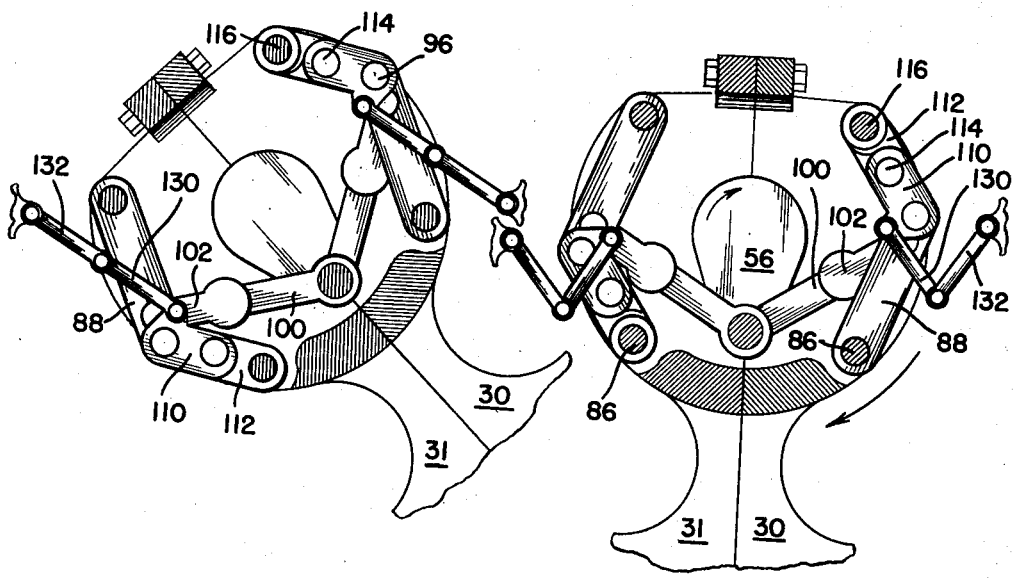
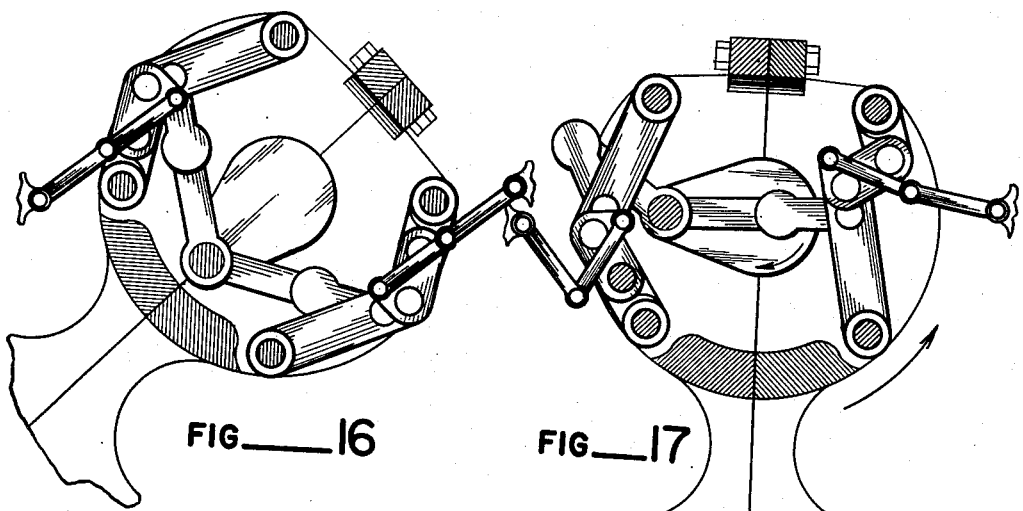
FIG__16  FIG__17
B4 FIRES
A1 COMPRESSES
A2 INTAKES
B3 SCAVENGES
HENRI J. LA VEILLE
INVENTOR.
BY *Smith & Tuck*
ATTORNEYS Patented Sept. 8, 1953

2,651,206

UNITED STATES PATENT OFFICE 2,651,206

MOTION CONVERTING MECHANISM

Henri J. La Veille, Oak Harbor, Wash.

Application September 17, 1951, Serial No. 246,918

8 Claims. (Cl. 74—25)

My invention relates to internal combustion engines and, more particularly, to a motion converting mechanism. The cylinders of my engine are of the toroidal type arranged in pairs with a corresponding pair of arcuate pistons oscillating in the cylinders. Transmitting means is provided to transmit this oscillating motion to the crank shaft in the form of rotary motion. This transmitting or transforming means is characterized by the locking of the piston assembly to the crank shaft in transmission of power so that the action is as if the power were being applied directly to the cranks in a direction tangential to the path of travel of the crank pin.

Various types of toroidal cylinder internal combustion engines have been patented in the past. However, these engines have not been constructed so as to take full advantage of the possibilities of mechanical advantage over the conventional internal combustion engine. In the conventional engine the pistons reciprocate in a rectilinear path and this motion must be changed to rotary motion. This change in motion is usually effected by a connecting rod on the piston linked to a crank on the drive shaft and power initially is applied when the crank is just past dead center toward the piston and continues to be applied until the crank is approximately dead center away from the piston. The most efficient transmission of power in this arrangement occurs when the connecting rod and crank are at right angles so that the force transmitted by the connecting rod acts in a direction tangential to the path of travel of the crank pin; and the efficiency of the transmission is comparatively poor as the crank is near the dead center positions because the force transmitted by the connecting rod is in a direction which is almost radial. A careful analysis will show that loss of power and wear of various parts occurs in this action with the piston being forced against one wall of the cylinder and with the crank shaft being biased toward and away from the crank. In a toroidal cylinder the power transmitting problem is different as the motion of the pistons is an oscillation in a path which forms an arc of a circle and this motion is closer to a rotary motion than that of a conventional engine. However the previous patentees have failed generally to take advantage of the possibilities of efficiency present and have connected the toroidal pistons to the crank shaft by a connecting rod with the crank at approximately dead center at the beginning of the power stroke in imitation of the conventional engine.

An object of my invention, therefore, is to provide a toroidal cylinder internal combustion engine in which the oscillating motion is transformed into rotary motion in the manner having the highest possible efficiency; and to provide means for locking the pistons to the crank shaft when they are moving in the direction of rotation of the crank shaft so that the piston is, in effect, secured to the crank shaft to exert its power in a tangential direction. Further objects include providing means so that the full power of the piston is directed against the crank shaft in a direction tangential to the path of travel of the crank pin during the period of maximum output in the power stroke of the piston; to reduce wear on the moving parts of an internal combustion engine, such as wear on the cylinder walls and on the crank shaft assembly, by reducing forces acting in directions other than in a tangent to the path of travel of the crank pin.

Other objects and advantages will be apparent from the following description or are inherent in the device. The invention will be best understood when the description is read with reference to the drawings, in which:

Figure 1 is a cross sectional view of my internal combustion engine taken in a plane transverse to the crank shaft axis;

Figure 2 is a sectional view of the engine in the plane of the crank shaft axis taken on line 2—2 of Figure 1;

Figure 3 is an enlarged perspective view of the power converting mechanism in my engine disposed between a crank arm and a rocker to which power is applied reciprocally by the internal combustion means;

Figure 4 is an exploded perspective view of certain linkage arrangements associated with the crank arm of the engine drive shaft;

Figure 5 is a perspective view of certain valves and cam actuator means therefor;

Figure 6 is a face view of a cheek plate of the rocker attachment to the crank shaft;

Figure 7 is an enlarged diagrammatic view of certain links employed in my engine;

Figure 8 is a perspective view of a portion of the engine casing with parts broken away and omitted for clarity of illustration;

Figure 9 is a perspective view of the engine crank shaft; and

Figures 10, 11, 12, 13, 14, 15, 16 and 17 are sequential diagraming views of the aspects assumed by certain linkages of the power converting means in my engine.

The engine shown in Figure 1 includes the casing 10 which comprises the base section 12 which may be mounted in suitable framework to position the engine. A sump 14 closed by plug 15 serves to accumulate and permit drainage of oil from the casing. Rising on each side of the base 12 are cylinder segments 16 and 18 arcuate in shape and rising above the base to near the top of the engine casing where they abut and join the engine head segment 20. Conventional bolt means join the casing parts together.

Each of the cylinder segments 16 and 18 includes curved chambers 22 open at each end and in which are disposed slidably a piston 24. Sealing rings 26 make the pistons fit tightly to the walls of the various chambers 22 in such a manner that gases may not pass from the firing chamber to the chamber 28 in which the operating mechanism of the engine is placed. Opposed pairs of pistons 24 are connected together by an arcuate rocker arm 30 through which power derived from the expansion of gases in the firing chambers is transmitted to the crank shaft of the engine. Each piston has a wrist connection 29 with the rockers 30.

The engine head segment 20 includes compression chambers 32, 32 which form termini for the chambers 22 and have openings in their walls to receive spark plugs 34 by which ignition is derived. Each chamber 32 also has a pair of lift valves 36, 38 which are closed by coiled springs 40 and opened by cam means to be described more fully.

Segment 20 is provided with a medial flue or passage 42 that merges with the outlet passage 44 to collect exhaust gases passing through the various exhaust ports when exhaust valves 38 are raised and conduct them outside the engine through passage 44 to the atmosphere. Both the exhaust and intake passages are T-shaped as can be seen in Figure 8. The intake passage is included in the manifold 46 and inlet tube 48 that is disposed internally of the segment 20 and in spaced relation within the passage which accommodates the exhaust gases of the engine. Valves 36 close openings in the compression chambers 32 through which the incoming explosive gaseous mixture supplied the engine is delivered from the manifold 46.

The drive shaft of the engine is shown in perspective in Figure 9 to comprise the main trunnions 50, 52, the intermediate journal portions 54 and crank arms 56 and 58 outstanding from the axis of the shaft at right angles to each other. In these drawings but two banks of opposed cylinders are employed and thus but a pair of crank arms is needed. In engines having more banks of chambers additional cranks would be used as required.

Each crank arm of the crank shaft is accompanied by an adjacent pair of camming discs and such are designated 60, 62 in the case of crank arms 56 and 64, 66 in the case of crank arm 58. These cams actuate the valves 36 and 38 through the intermediary of cam followers 68 which are hingedly mounted within the engine casing by means of hinge pins 70 and mounting ears 72. The cams in pairs are positioned on the shaft one on each side of the crank arm and are so secured that they rotate with the shaft during operations of the engine.

The crank shaft has at one end the flywheel 76 as shown in Figure 2 and its ends are journalled in the casing by means of bearing plate 78, 79 that are secured in place by suitable bolts.

The power converting mechanism 80 shown in Figure 3, and also Figures 10 through 17, is disposed within the rocker link 30 that is caused to move reciprocally under the influence of the sequentially fired and opposed expansible chambers in each bank of the engine. It will be understood that the rocker swings back and forth with its mid-portion 31 travelling between the lower edges 19 of the inner cylinder walls, which is approximately a 90 degree arc. The mechanism 80 has its axis coincident with the crank shaft axis and includes cheek plates 82, 84 journalled on the shaft portions 54 on opposite sides of the crank arm 56 or 58 as the case may be.

By means of pivot pin 86 I hingedly mount supporting link 88 between plates 82, 84. Link 88 includes the split gudgeon 90 to couple the link on pin 86 which is securely obtained by squeezing the gudgeon parts as by screw 87 passing through ears 89. Link 88 also comprises spaced apart arms 92, 92 which are rigidly joined by clamp sleeve 94 that is intermediate those ends of the arms 92 oposite their connection to gudgeon 90. Sleeve 94 is clamped to pin 96 by screw 95 in ears 97.

Between a crank arm, as 56 in Figure 3, and link 88, I mount a pair of articulated connecting links 100 and 102. Link 100 is in the form of a connecting rod of conventional shape and is secured hingedly to the crank pin between arms 56 at one end and likewise hingedly joins link 102 by means of pin 104 passing through suitable openings. A pin 106 pivotally joins link 102 to link arms 92 intermediate their ends.

Link 88 is further but movably joined between the cheek plates of the power converting mechanism by means of a restraining linkage including H-link 110 and T-link 112. Two legs of the H-link straddle the clamp 94 and are pivotally joined thereto by pin 96. The single leg of T-link 112 is disposed between and connected hingedly to H-link 110 by pin 114 which is locked by a set screw 115. T-link 112 has at its head end 113 a pin 116 which protrudes at its end in the manner of trunnions that are journalled in cheek plates 82, 84. Between the T-link 112 and plate 82 is a coil spring 118, anchored at its ends, to bias the T-link to swing inward normally. Such bias tends to resist the cocking action that occurs between links 110 and 112 as shown by dashed lines in Figure 7 and to maintain pins 96, 114 and 116 in line.

Link 102 is also biased by leaf spring 120 that is anchored to the link at one end by a screw 121 and at the other end by lip 122 resting against shoulder 124 that is part of the clamp sleeve 94 as seen clearly in Figure 7.

Cocking of the T-link 112 and H-link 110 is facilitated during operation of the engine by medially hinged draft means comprising links 130-132 that are mounted between the bell crank arm 134 of H-link 110 and an engine casing ear 136.

The power converting means 80 of each pair of expansible chambers of the engine includes two sets of linkage, one on each side of the crank shaft, but disposed in opposite relation.

Arm 134 abuts a shoulder 136 on link arm 92 whereby outward cocking of link 88 and 110 is precluded. Likewise bosses 111 on link 110 seat into recesses 109 in link 112 to prevent pin 114 moving inward of the line between pins 116 and 96. Stop means 160, 161 on T-link 112 and H-link 110 respectively serve the same purpose.

Cheek plate 84 has segments of bevel gear teeth 140 on the outer face which mesh with idler gears 142 and 144 that turn on shafts 146.

*Method of operation*

This engine is of the four cycle type having four cylinders and each cylinder completing the four cycles in one revolution of the crank shaft. Of course the engine could be modified easily to a construction having more or less than four cylinders. For convenience of reference the cylinders as shown in Figures 1 and 2 have been designated A1, A2, B3 and B4 and fire in that order. Assuming that the rocker arm, crank, and linkage therebetween shown in Figure 1 is being illustrated in Figures 10 to 17, the following chart gives the sequence of operation showing the position of the linkage in relation to the type of stroke the various cylinders are ready to begin.

| Position of Linkage | A1 Cylinder | A2 Cylinder | B3 Cylinder | B4 Cylinder |
|---|---|---|---|---|
| Figure 10 | Fire | Compress | Intake | Scavenge |
| Figure 12 | Scavenge | Fire | Compress | Intake |
| Figure 14 | Intake | Scavenge | Fire | Compress |
| Figure 16 | Compress | Intake | Scavenge | Fire |

(The notations of operations of the various cylinders in Figures 10, 12, 14 and 16 are given with the assumption that the linkage connected to the A1, A2 cylinders is shown in the figures.)

The following chart gives the positions of the linkage connected to the A cylinders and the positions of the linkage connected to the B cylinders as the various cylinders are ready to fire.

| Cylinder in position to fire | Linkage of A1, A2 cylinders | Linkage of B3, B4 cylinders |
|---|---|---|
| A1 | Figure 10 | Figure 12 |
| A2 | Figure 12 | Figure 14 |
| B3 | Figure 14 | Figure 16 |
| B4 | Figure 16 | Figure 10 |

Considering Figure 10 and assuming that the linkage shown is connected to the A cylinders, the rocker arm will move to the left as cylinder A1 is fired and the crank is to be moved in a clockwise direction. Tension links 100, 102 are in position to transmit the power generated by the firing of the A1 cylinder directly to the crank during the stroke shown in Figures 10, 11 and 12. Members 88, 110 and 112 cannot collapse in the position shown so the rocker arm and crank move as one member. Referring to Figures 4 and 7, spring 118 is connected to T-link 112 and to plate 82, and, hence, tends to fold members 100 and 112 inward. The inward biasing is limited by stops 109, 111, 160, 161 between members 110 and 112 but members 110 and 112 are folded inwardly far enough that the center of pin 114 lies to the right of the line connecting the centers of pins 116 and 96 in Figure 7. Therefore, members 110 and 112 act like a single rigid member in the operation shown in Figures 10, 11 and 12. If the center of pin 114 were to lie above the line between the centers of pins 116 and 96 in Figure 10, members 110 and 112 would jackknife outward and the links would not transmit the power between the rocker arm and crank, so spring 118 is important to the operation.

Again assuming that the linkage shown is connected to the A cylinders, in Figure 12 cylinder A2 is ready to fire and the rocker arm will move to the right. However the linkage is not in position to transmit power between the rocker arm and the crank. Referring to the chart, it will be seen that the linkage of the B3, B4 cylinders is disposed as shown in Figure 14 and is in position to transmit power to the crank through links 100 and 102. The rocker arms of the A and B cylinders are connected by means of the bevel gears 140, 142 and 144. Upon firing of the A2 cylinder the power from the A cylinder rocker arm is transmitted to the B cylinder rocker arm through the bevel gears. With the B linkage in the position shown in Figure 14, the parts act in the same manner as if the rocker arm shown were secured directly to the cylinder being fired. Links 100 and 102 are secured to members 88, 110 and 112 which are in uncollapsible position and the crank moves with the rocker arm as it moves to the right through the sequence of positions shown in Figures 14, 15 and 16.

Referring to the A linkage, the parts go through the sequence of positions shown in Figures 12, 13, and 14 when the A2 cylinder is fired. The rocker arm is moving to the right while the crank is moving clockwise so the parts must accommodate themselves to the movement of the crank until it assumes the position shown in Figure 14. Tension links 100 and 102 must jackknife in order to permit the crank to pass. Referring to Figure 4, it will be seen that members 100 and 102 can only fold through the opening between members 92 of link 88 as members 110 and 112 block folding on the other side of pin 106. To insure bending of tension links 100, 102 in the right direction it is necessary to employ spring 120 between tension link 102 and member 88, which biases tension link 102 downward toward the lower end of member 88.

Meanwhile, pin 106 on the left hand side of the A linkage must move toward the crank to accommodate the movement of the crank pin to the right. This is accomplished by the folding of members 88, 110 and 112 as shown in Figure 13. It will be noted that the engine would be stopped or the parts would break if members 88, 110 and 112 were to remain in the position shown in Figure 12. With the center of pin 114 lying to the right of a line between the center of pins 116 and 96, members 88, 110 and 112 would normally remain in this relative position against the urging of tension links 100, 102 to move pivot pin 106 to the right; and, therefore, it is necessary to have positive means to insure that members 88, 110 and 112 assume the position shown in Figure 13. This positive means is provided by pull links 130 and 132 connected to bell crank arm 134 and engine casing ear 136. Links 130, 132 pull bell crank 134 in a clockwise direction at the very end of the sequence shown in Figures 10, 11 and 12 so that the center of pin 114 is at the left of the line between the centers of pivot pins 116 and 96 in the position shown. The second function of links 130, 132, acting through bell crank 134, is to pull members 110, 112 and 88 back into locked position at the end of the stroke, as shown in Figure 14. As will be evident, the linkage requires positive means to insure that it is caused to assume the locked position of Figure 14 at the end of the stroke.

When the linkage connected to the A cylinders reaches the position shown in Figure 14, cylinder B3 is ready to fire. The B linkage is in the position shown in Figure 16, as shown in the above chart, and will not transmit the power as the rocker arm and the crank are moving in opposite directions. During the power stroke of cylinder B3, the B linkage follows the unlocking cycle shown in Figures 16, 17 and 10 with tension links 100, 102 jackknifing on the left hand side and with links 130, 132 unlocking members 110, 112, and 88 just before the position shown in Figure 16 is reached and locking them through action on bell crank 134 as these members reach the position shown in Figure 10. While the B linkage follows the sequence of Figures 16, 17 and 10, the A linkage receives the power created by the firing of cylinder B3 by means of the bevel gear and moves the crank 90 degrees clockwise through the action shown in Figures 14, 15 and 16. It will be observed that during the firing of the A2 and B3 cylinders, the power was not transmitted directly from the rocker arm to its associated crank but instead the power is transferred through the bevel gears to the opposite crank.

On the firing of the B4 cylinder, the B crank assembly is in the position shown in Figure 10 and follows the cycle of Figures 10, 11 and 12 to transmit the motion of the rocker arm directly to the associated crank. Meanwhile the A cylinder linkage is unlocked from its associated crank and follows the sequence shown in Figures 16, 17 and 10 permitting the crank arm to pass to an upper position and ready for the cycle to repeat.

The right hand connector parts carry the load during the cycle shown in Figures 10, 11 and 12 and the left hand parts carry the load during the sequence shown in Figures 14, 15 and 16 with the parts on the opposite side of the crank arm idle as links 100, 102 only act in tension. However, these idle parts have a function during these power strokes in event of a misfire of the cylinder which is supposed to fire at that point. It is necessary for the rocker arms to continue their movement during a misfire so that they will be in position to continue their cycle. Flywheel 76 continues rotation moving the crank and the crank moves the rocker arm instead of the rocker arm moving the crank. An example would be a misfiring of cylinder B3. The A linkage is in the position shown in Figure 14 and the left hand tension links 100, 102 are supposed to pull the crank in a clockwise direction. Cylinder B3 failing to fire, no power is applied through the gears to the rocker arm associated with the A cylinders. Instead, the crank is moved in a clockwise direction by the flywheel and carries the A cylinder rocker arm with it by means of links 100, 102 on the right hand side in Figure 14 and the rocker arms follow their usual cycle.

When a rocker arm is secured to the crank to transmit power, as for instance in Figures 10, 11 and 12, the rocker arm and crank assembly move as one member, so the mechanism acts in the same manner as if the firing piston were itself secured to a crank. The force of the piston is exerted in a direction tangential to a circle having its center at the crank shaft and no power is wasted through pressure radial of the crank shaft. This is of course the most efficient way to transmit power to the crank shaft as pressures radial of the crank shaft created by the movement of the piston are wasteful as well as causing wear on the parts. In the present construction, it will be noted that the piston is not forced against a cylinder wall as by the conventional connecting arm and that the crank arm is not pressed toward or away from the crank shaft by a connecting arm.

Although I have described a specific embodiment of my invention, various changes in details therein will occur to those skilled in the art and I do not wish to be understood as limiting myself to the exact structure shown but wish to claim those modifications within the scope of my invention, as set forth in the appended claims.

I claim:

1. In a toroidal cylinder internal combustion engine having two pair of oppositely facing pistons disposed to travel an oscillatory path of travel forming an arc of a circle of approximately ninety degrees and each pair being connected by a rocker arm, means to convert the oscillating motion of said pistons to rotary motion, comprising: gear means connecting said rocker arms together in a manner so that they can only move in opposite directions; a drive shaft aligned with the center of said circle; a pair of cranks having their inner ends secured to said drive shaft; and locking and unlocking means locking each rocker arm to the outer end of its crank when they are moving in the same direction in a manner so as to prevent relative motion therebetween and unlocking each rocker arm from the outer end of its crank when they are moving in opposite directions so as to permit free relative movement therebetween.

2. In a toroidal cylinder internal combustion engine having a pair of oppositely facing pistons disposed to travel an oscillatory path of travel forming an arc of a circle of approximately ninety degrees and connected by a rocker arm, means to convert the oscillating motion of said pistons to rotary motion, comprising: a drive shaft aligned with the center of said circle; a crank having its inner end secured to said drive shaft; and locking and unlocking means locking said rocker arm to the outer end of said crank when they are moving in the same direction in a manner so as to prevent relative motion therebetween and unlocking said rocker arm from the outer end of said crank when they are moving in opposite directions in a manner so as to permit free relative movement therebetween.

3. In a toroidal cylinder internal combustion engine having two pair of oppositely facing pistons disposed to travel an oscillatory path of travel forming an arc of a circle of approximately ninety degrees and each pair being connected by a rocker arm, means to convert the oscillating motion of said pistons to rotary motion, comprising: means connecting said rocker arms together in a manner so that they can only move in opposite directions; a drive shaft aligned with the center of said circle; a pair of cranks having their inner ends secured to said drive shaft; a plate secured to each rocker arm and extending inwardly toward the center of said circle; and locking and unlocking means locking said plate to the outer end of its adjacent crank when the plate and crank are moving in the same direction in a manner so as to prevent relative movement therebetween and unlocking said plate from the outer end of its adjacent crank when the plate and crank are moving in opposite directions in a manner so as to permit free relative movement therebetween.

4. The subject matter of claim 1 in which said locking and unlocking means includes two collapsible tension links connected to the outer end of each crank and to the rocker arm associated with the crank, one tension link extending from the crank generally in the direction of travel of the rocker arm in one direction and the other tension link extending from the crank generally in the direction of travel of the rocker arm in the other direction, whereby a tension link will be in position to pull the crank with the rocker arm when the rocker arm and the crank are moving in the same direction and whereby a tension link will be in position to pull the rocker arm with the crank upon misfiring of a piston; and a flywheel connected to said drive shaft to insure continuation of movement of said drive shaft in event of misfiring of a piston.

5. The subject matter of claim 4 in which there is securing means connecting each tension link to said rocker arm which permits the tension link to collapse and pass as the associated crank moves past the securing means, said securing means being collapsible to permit the tension link to follow the associated crank when it moves through a portion of its path diametrically opposite from the securing means; and operating means to initiate collapsing of the securing means and to initiate locking of the securing means in its operative position after the securing means has passed through its collapsing action.

6. In a toroidal cylinder internal combustion engine having a pair of independent power driven rocker arms disposed to travel an oscilatory path of travel forming an arc of a circle, means to convert the oscillating motion of said rocker arm to rotary motion, comprising: a drive shaft aligned with the center of said circle; a pair of radial cranks secured to said drive shaft; a pair of collapsible tension links for each crank, each link having one end pivotally connected to its crank, and one link of each pair extending from the crank generally in the direction of travel of the rocker arm in one direction and the other link extending from the crank generally in the direction of travel of the rocker arm in the opposite direction; a plate fixed to each rocker arm; a locking assembly for each tension link comprising a first, second and third locking members connected together in end to end series in that order with the ends of the locking assembly pivotally connected to said plate, said first and second locking members having stop means for stopping them at a locked position by preventing them from folding toward said shaft farther than a short distance beyond the point where they are aligned; a spring connected to said plate and to said first locking member biasing said first locking member toward said locked position, the other end of each link being pivotally connected to said third locking member at a point near said second locking member; said second locking member having a bell crank arm; means for pulling said bell crank arm to move said second locking member out of locked position as the associated crank moves toward a position on the opposite side of said shaft from the locking assembly and to move said second locking member back into locked position as the associated crank moves away from said position on the opposite side of said shaft from the locking assembly; and gear means connecting said plates in a manner so that they move in opposite directions.

7. In a toroidal cylinder internal combustion engine having a pair of independent power driven rocker arms disposed to travel an oscilatory path of travel forming an arc of a circle, means to convert the oscillating motion of said rocker arm to rotary motion, comprising: a drive shaft aligned with the center of said circle and a pair of radial cranks secured thereto; gear means connecting said rocker arms in a manner so that they move in opposite directions; a pair of collapsible tension links for each crank, each link having one end pivotally connected to the free end of its crank, said tension links being arranged so that one is directed generally in the direction of travel of the rocker arm in one direction and the other tension link extending from the crank generally in the direction of travel of the rocker arm in the other direction; means locking each tension link to its rocker arm for moving the associated crank during the power stroke of the rocker arm, the tension link being locked when its crank and rocker arm are moving together in the same direction and when the tension link extends from the crank in said same direction.

8. In a toroidal cylinder internal combustion engine having a power driven rocker arm disposed to travel an oscillating path of travel forming an arc of a circle, means to convert the oscillating motion of said rocker arm to rotary motion, comprising: a drive shaft aligned with the center of said circle; a radial crank secured to said drive shaft; a pair of collapsible tension links for said crank, each link having one end pivotally connected to said crank, and one link of said pair extending from the crank generally in the direction of travel of the rocker arm in one direction and the other link extending from the crank generally in the direction of travel of the rocker arm in the opposite direction; a plate fixed to said rocker arm; a locking assembly for each tension link comprising a first, second and third locking members connected together in end to end series in that order with the ends of the locking assembly pivotally connected to said plate, said first and second locking members having stop means for stopping them at a locked position by preventing them from folding toward said shaft farther than a short distance beyond the point where they are aligned; a spring connected to said plate and to said first locking member biasing said first locking member toward said locked position, the other end of each link being pivotally connected to said third locking member at a point near said second locking member; said second locking member having a bell crank arm; means for pulling said bell crank arm to move said second locking member out of locked position as the associated crank moves toward a position on the opposite side of said shaft from the locking assembly and to move said second locking member back into locked position as the associated crank moves away from said position on the opposite side of said shaft from the locking assembly.

HENRI J. LA VEILLE.

References Cited in the file of this patent

UNITED STATES PATENTS

| Number | Name | Date |
| --- | --- | --- |
| 736,151 | Primat | Aug. 11, 1903 |
| 832,077 | Pearce | Oct. 2, 1906 |
| 1,716,621 | Cizek | June 11, 1929 |
| 2,123,279 | George | July 12, 1938 |
| 2,157,764 | Langrognet | May 9, 1939 |
| 2,163,052 | Niemi | June 20, 1939 |
| 2,413,957 | Daub | Jan. 7, 1947 |
| 2,416,846 | Richter | Mar. 4, 1947 |
| 2,482,136 | Wright | Sept. 20, 1949 |